United States Patent [19]

Head

[11] Patent Number: 4,782,624

[45] Date of Patent: Nov. 8, 1988

[54] FISHERMAN'S ALL PURPOSE BOAT MOUNTED STAND

[76] Inventor: James R. Head, Rte. 3, Box 6, Wilburton, Okla. 74578

[21] Appl. No.: 160,252

[22] Filed: Feb. 25, 1988

[51] Int. Cl.⁴ .............................................. A01K 93/00
[52] U.S. Cl. .................................... 43/21.2; 211/60.1
[58] Field of Search ............... 43/21.2; 248/121, 512; 24/62, 64, 65, 60.1, 69, 70.8

[56] References Cited

U.S. PATENT DOCUMENTS

| | | | |
|---|---|---|---|
| 290,371 | 12/1883 | Udell | 211/65 |
| 3,610,431 | 10/1971 | Rodden | 211/60.1 |
| 3,661,270 | 5/1972 | Lucci et al. | 211/62 |
| 4,311,262 | 1/1982 | Morin | 43/21.2 |
| 4,671,009 | 6/1987 | Faunce | 43/21.2 |

Primary Examiner—M. Jordan
Attorney, Agent, or Firm—Head & Johnson

[57] ABSTRACT

A sport fisherman's all purpose utility pole is adapted to be positioned and retained within a boat for supporting prebaited and assembled fishing rods and reels.

4 Claims, 5 Drawing Sheets

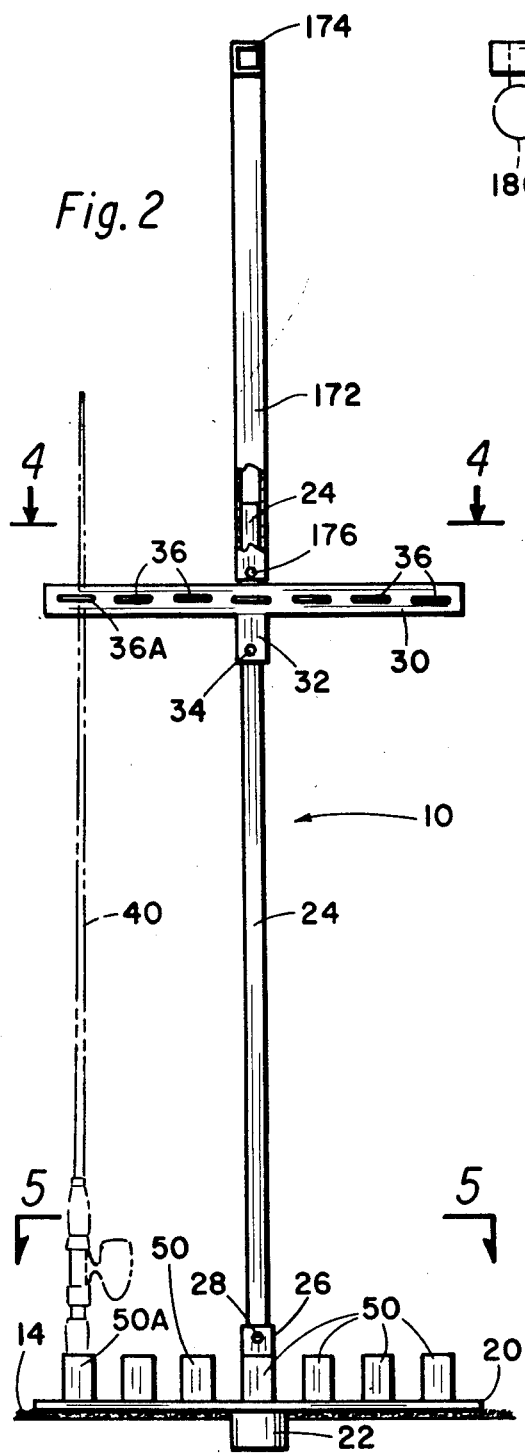
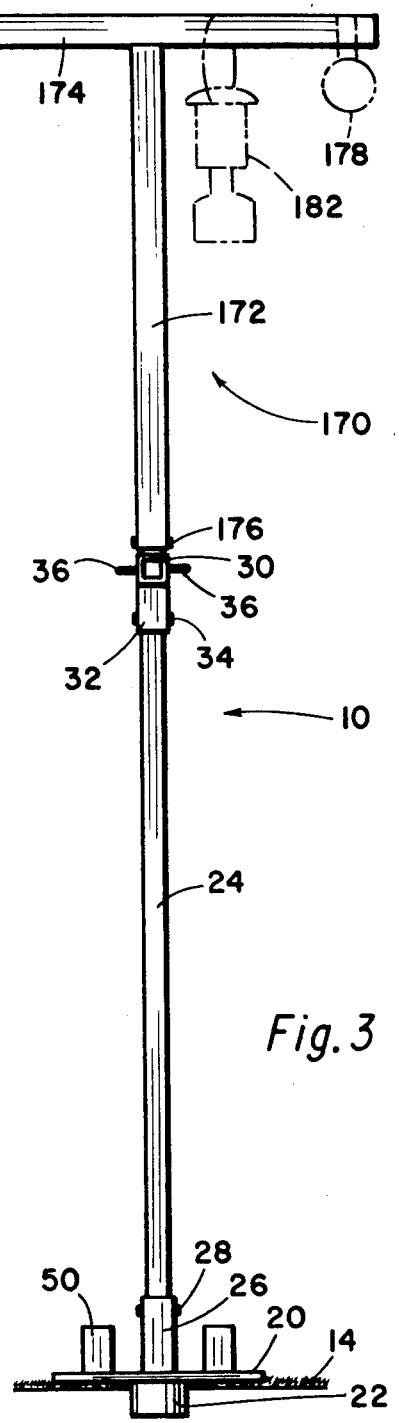
Fig. 2
Fig. 3

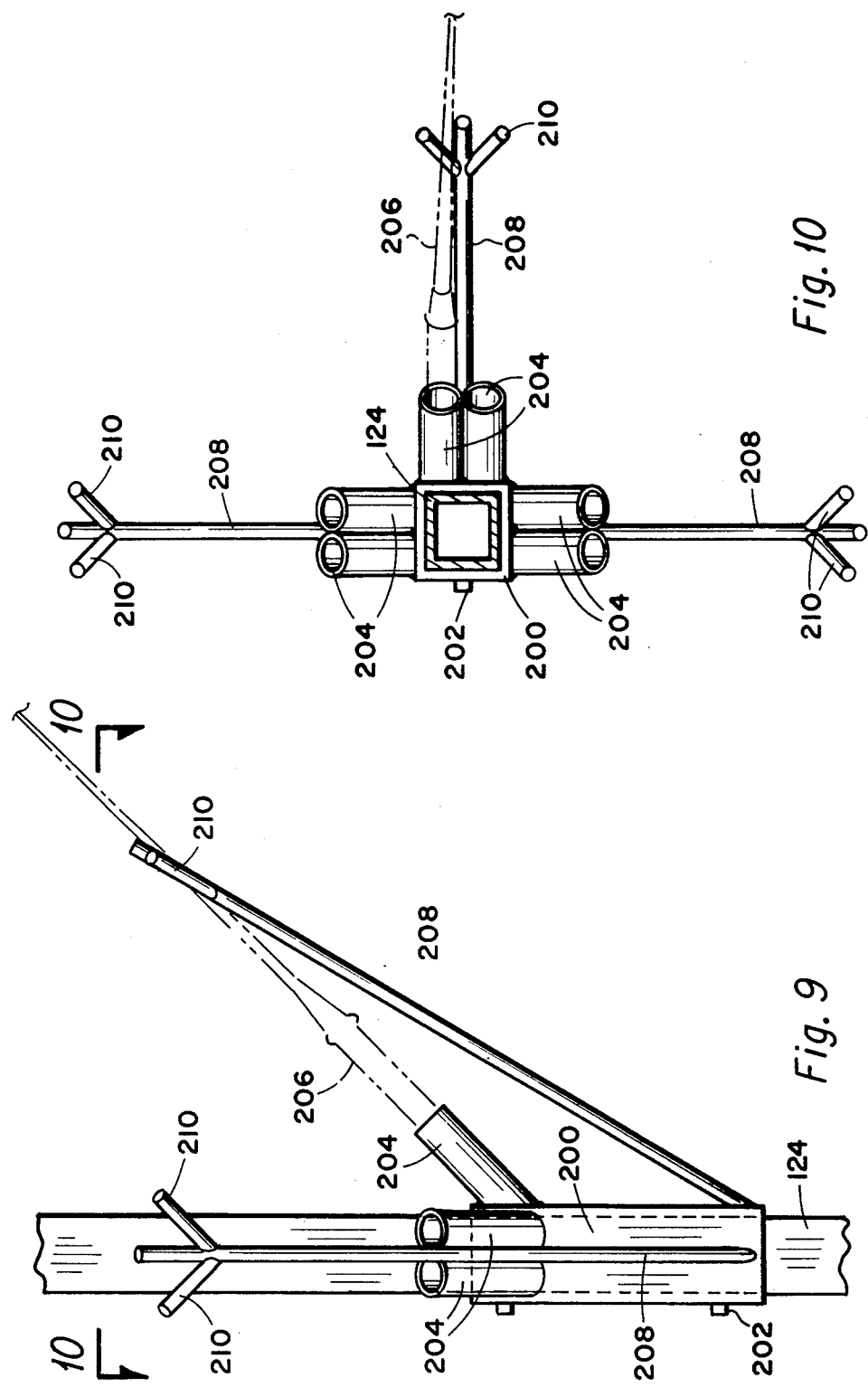

FISHERMAN'S ALL PURPOSE BOAT MOUNTED STAND

BACKGROUND

This invention is directed to the sport of fishing. In particular, the invention is directed an apparatus for carrying and supporting a plurality of preassembled and baited fishing rods and reels in a fishing boat.

Modern day sport fishing, and in particular bass fishing, has developed to such an extent that the fisherman must be prepared for all types of conditions that may be encountered. The industry has perfected multitudinous types of fishing rods, reels and lures to meet the needs of the sport fisherman for the conditions he is apt to encounter for successful results. This need is emphasized in tournament fishing. For example, there may be conditions that require the use of spinning rods and reels, or casting rods and reels and multitudinous combinations of line types, weights and lure weights, lengths, etc. There are rod and reel combinations called "flipping sticks" and "cranking sticks" and "pitching sticks", all of which are applicable to particular fishing situations that may be encountered. A look at any sport fishing catalog will only attest to the variety available to the fisherman. To make up a particular rod/reel/line/lure situation once 'on-the-water' so to speak is time consuming, which in tournament situations is vital. However, having all of these rod and reel combinations in a boat can create situations where rods and reels can be stepped on, broken, tangled and become totally unaccessible to the fisherman once he has reached the area to be fished.

SUMMARY OF INVENTION

This invention is directed to as its primary object to provide apparatus for supporting assembled and baited fishing rods and reels for travel in a boat that will keep each rod and reel neatly separated from each other, from damage or entanglement and yet be readily available for use by the fisherman for the particular situation.

It is a further object of this invention to provide an apparatus for support within a boat that not only provides means to support fishing rods and reels for travel, but also provide means for supporting fishing rods and reels during actual fishing situations such as in trolling or still fishing.

It is a further object of the invention to provide an all purpose apparatus that includes means for supporting auxiliary navigation lights or lights used for night fishing.

In particular, the apparatus of the invention comprises a base pedestal that is supported to said boat which can be easily and readily removed therefrom. A vertical column is removably attached to the base pedestal. A transverse member is removable attached to the vertical column at a vertically spaced position above said base pedestal. A plurality of aligned and spaced spring biased clips are attached along the transverse member with each clip adapted to releasably retain the intermediate portion of a respective fishing rod. A plurality of tubular receptacles are attached to the pedestal with each receptacle adapted to receive the respective butt end of said rod. Each receptacle is positioned in alignment with each of the clips. Each of the tubular receptacles are spaced sufficiently apart to prevent contact with the next adjacent rod and reel.

BRIEF DESCRIPTION OF THE DRAWINGS

FIG. 2 is a side elevational view of one embodiment of this invention.

FIG. 3 is an end elevational view of the apparatus shown in FIG. 2.

FIG. 9 is a partial view of the fishing rod and reel holder.

FIG. 10 is a sectional view taken along the line of 10—10 of FIG. 9.

DETAILED DESCRIPTION OF THE DRAWINGS

Before explaining the present invention in detail, it is to be understood that the invention is not limited to its application to the details of construction and arrangement of parts illustrated in the accompanying drawings, since the invention is capable of other embodiments and of being practiced or carried out in various ways commensurate with the claims herein. Also it is to be understood that the phraseology or terminology employed herein is for the purpose of the description and not of limitation.

Figure 1:
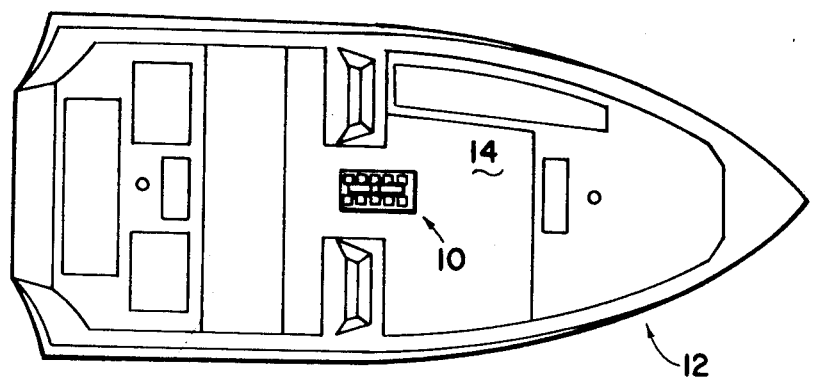
FIG. 1 is a top elevational view of a boat with the all purpose stand of this invention shown mounted thereto.
Figure 4:
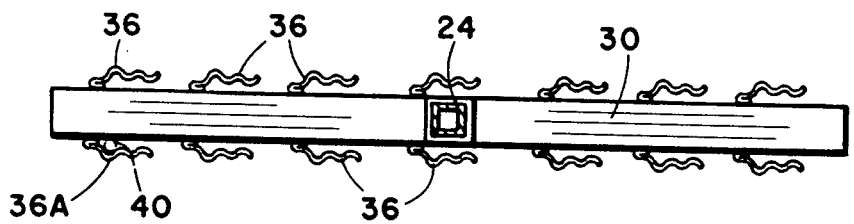
FIG. 4 is a sectional view taken along the line 4—4 of FIG. 2.
Figure 5:
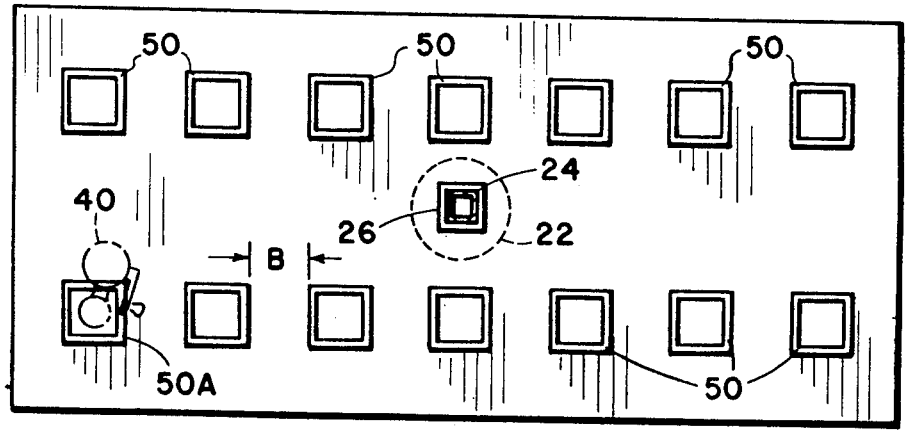
FIG. 5 is a sectional view taken along the line of 5—5 of FIG. 2.

Referring now to FIG. 1 wherein the invention is described and generally identified by the numeral 10 as it could be positioned within a boat generally designated by the numeral 12. The devise 10 in this particular embodiment being supported upon the floorboard 14 of the boat. It is to be understood that this is merely one of many positions that the apparatus of the invention could be positioned during travel to the fishing site.

Referring now to FIGS. 2-5, the invention is described as having a base plate 20 having a pedestal 22 which, in this instance, extends through the floorboard of the boat to provide vertical support to the apparatus. To the base plate is attached a column 24 which is telescopically retained within sleeve 26 and retained by a pin 28 which allows the unit to be easily knocked down for storage elsewhere as the case may be. A transverse member 30 is removable attached to the vertical column 24 as for example by a telescopic connecting sleeve 32 which may be retained by a pin 34. The transverse member is vertically spaced at a position above the pedestal for the use and purposes herein set forth. Attached on each side of the transverse member 30 are a plurality of aligned and spaced spring bias clips 36. Each clip is adapted to releasably retain the upper or intermediate portion of the fishing rod shown here and identified by the numeral 40. A plurality of tubular receptacles 50 are attached to the base, each receptacle adapted to receive the handle or butt end of the rod 40. Each receptacle is positioned on the base so as to be in alignment with a respective clip 36. For example, receptacle 50A is adapted to coincide with spring clip 36A as shown in FIG. 2. The receptacles are also sufficiently spaced apart as for example at dimension B (FIG. 5) to prevent contact at the next adjacent rod and reel and thus prevent damage and entanglement.

Figure 6:
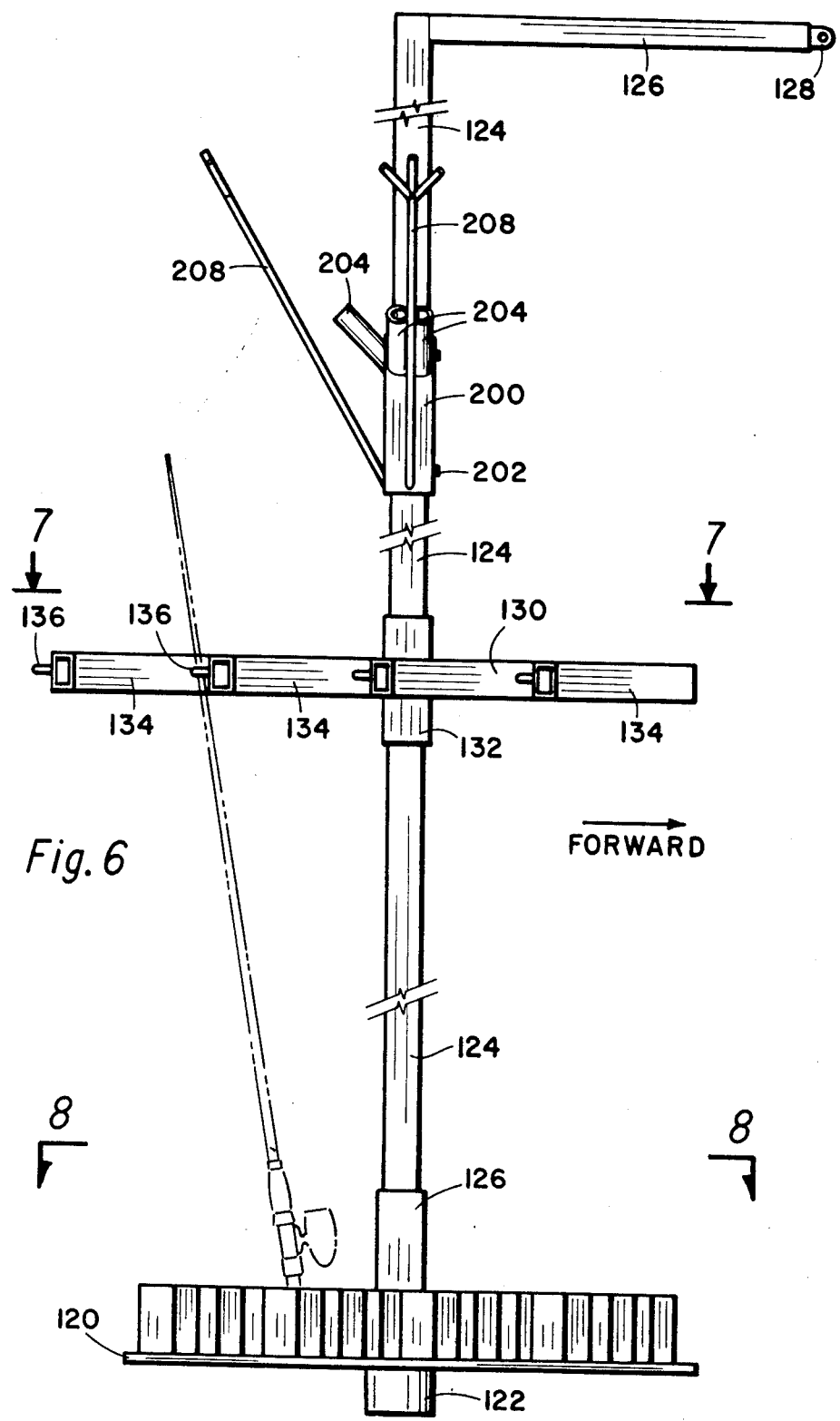
FIG. 6 is an side elevational view of an additional embodiment of the apparatus of this invention.
Figure 7:
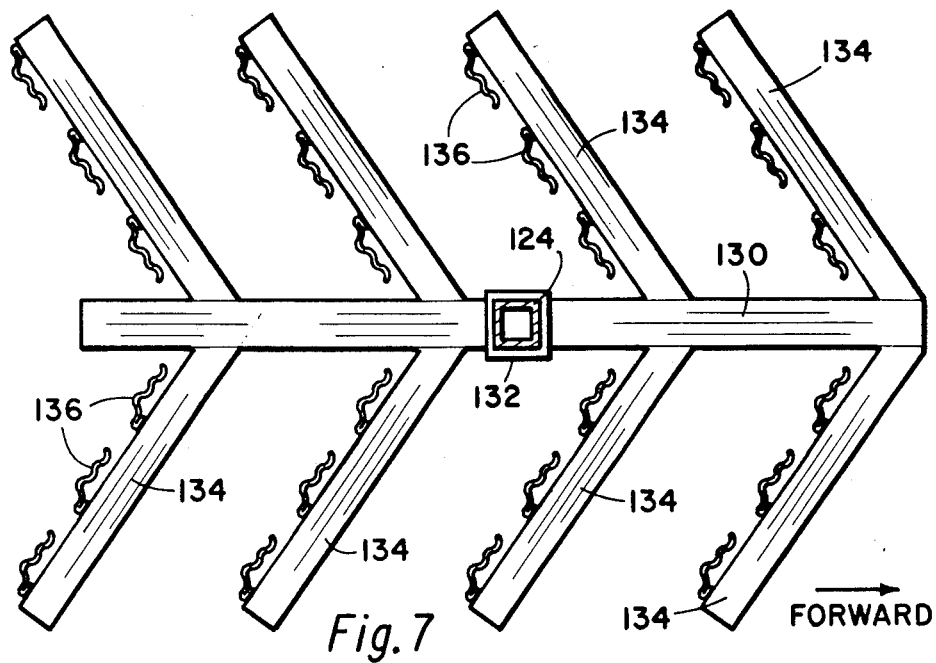
FIG. 7 is a sectional view taken along the line 7—7 of FIG. 6.
Figure 8:
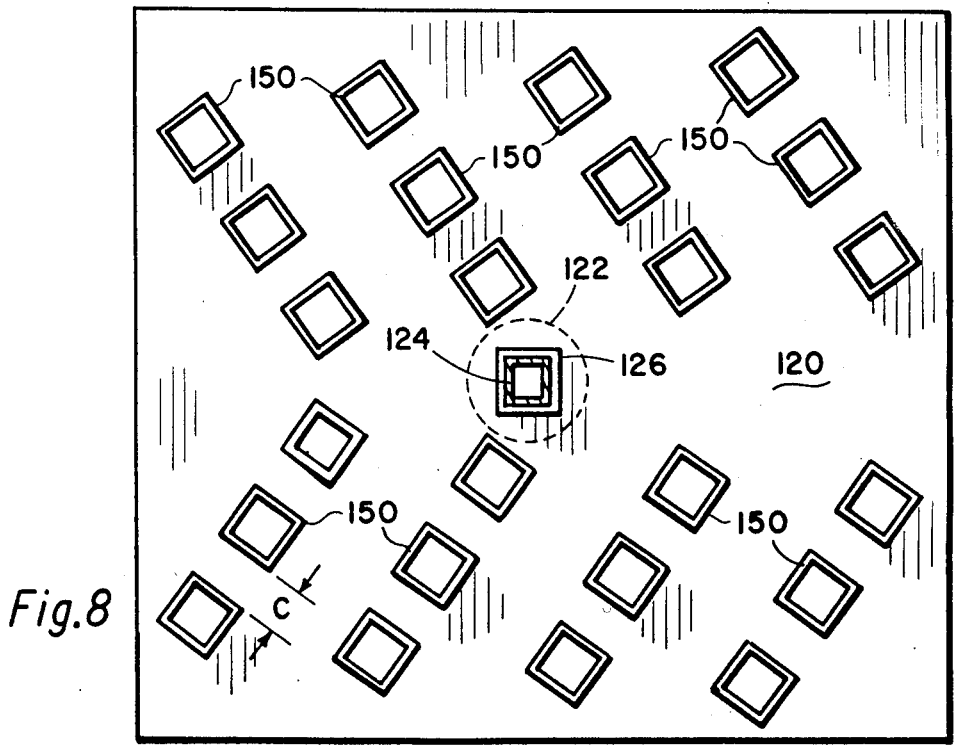
FIG. 8 is a sectional view taken along the line of 8—8 of FIG. 6.

The embodiment of FIG. 6-8 provides an alternate apparatus capable of holding a substantially larger number of rods and reels. The device comprises a base 120 which may be supported to the boat by way of pedestal 122. Extending upwardly from the base 120 is a vertical column 124 which is telescopically positioned within sleeve 126 formed as a vertical upward member from the base 120. A transverse member, in this embodiment, designated by the numeral 130, is telescopically positioned over the vertical column 124 by way of sleeve 132. In this embodiment, referring particular to FIG. 7, the transverse member is oriented along the fore and aft axis of the boat and includes a plurality of support arms 134 which are angularly attached outwardly and rearwardly to the transverse member 130 and in the same plane of the transverse member 130. The plurality of the lined and spaced sprint biased clips 136 are attached along the rearward side of each of the support arms. The clips being such as to releasably retain a respective fishing rod. Similar to the previous embodiment a plurality of tubular receptacles 150 are attached to the base member 120 to receive the respective butt end of each rod. Each receptacle is positioned so as to create an aligned zone for a pre-assembled rod and reel with a respective clip 136. The receptacles are spaced sufficiently apart by distance C to prevent substantial contact with the adjacent rod and reel.

One of the unique aspects of the invention is its adaptability to accessories for other functions that will be used in the sport of fishing. For example, referring to FIGS. 2 and 3, a tee shaped member generally designated by the numeral 170 comprises a vertical portion 172 and a upper horizontal portion 174 the former of which is telescopically positioned over an extension of vertical column 24 and retained by a clip 176. The purpose of the device is to permit the ready attachment of other fishing and/or navigational accessories such as navigational spotlights 178 or 180 or a lantern 182 for night fishing purposes.

A further embodiment is shown in FIGS. 6, 9 and 10 wherein a sleeve member 200 is telescopically retained over through an extension of vertical column 124 and retained by a pin 202. In this embodiment there is a plurality of tubular segments 204 which are adapted to receive the butt end of the fishing rod 206 shown dotted. The tubular segments are angularly attached to the sleeve 200 in an upward and outward direction. Adjacent each of the tubular segments is a respective extension rod 208 having at its outer end means, such as the V-shaped segments 210 to capture and retain the rods for use during a variety of fishing operations whether it be for trolling or still fishing. In this embodiment is described a continuation of the vertical arm 124 to a single horizontal upper portion 126 having means 128 at one end to receive lanterns, lights, and any other fishing accessories.

What is claimed is:

1. Apparatus for supporting preassembled fishing rods and reels in a boat, each rod comprised of a butt end and a tip, said apparatus comprising a base and having means extending below said base for supporting said base upon said boat;

a vertical column removably attachable to said pedestal;

a transverse member removably attached to said column at a vertically spaced position above said pedestal;

a plurality of a lined and spaced spring bias clips attached to said transverse member, each said clip to releasably retain a respective rod;

a plurality of tubular receptacles attached to said pedestal, each receptacle adapted to receive the respective butt end of said rod, each receptacle positioned in alignment with each of said clips, said receptacles spaced sufficiently apart to prevent contact of the next adjacent rod and reel.

2. Apparatus for supporting preassembled fishing rods and reels in a boat, each rod comprised of a butt end and a tip, said apparatus comprising a base and a pedestal extending below the base for supporting said base upon said boat;

a vertical column removably attachable to said pedestal;

a transverse member removably attached to said column at a vertically spaced position above said pedestal, said transverse member oriented along a fore and aft axis of said boat, a plurality of support arms angularly attached to said transverse member in the same plane of said transverse member in an outwardly and rearwardly direction;

a plurality of lined and spaced spring biased clips attached along the rearward side of each support arms, each clip to releasably retain a respective rod;

a plurality of tubular receptacles attached to said pedestal, each receptacle adapted to receive the respective butt end of said rod, each receptacle positioned in alignment with each of said clips, said receptacle spaced sufficiently apart to prevent contact of the next adjacent rod and reel.

3. The apparatus of claims 1 or 2 including a sleeve removably attached to said vertical column comprising at least one tubular segment to receive the butt end of said rod, said tubular segment angularly attached outwardly and upwardly to said sleeve, and upwardly and outwardly positioned extension rod attached to said sleeve contiguous to said segment, said extension rod having means at its outer end to receive said fishing rod.

4. Apparatus of claim 1 or 2 including an upper extension arm means removably attached to said vertical column, said extension arm means including at least one transverse member having means to receive or retain fishing and/or navigational lights.

* * * * *